(12) United States Patent
Shimomura

(10) Patent No.: US 10,661,610 B2
(45) Date of Patent: May 26, 2020

(54) PNEUMATIC TIRE

(71) Applicant: TOYO TIRE & RUBBER CO., LTD., Itami-shi, Hyogo (JP)

(72) Inventor: Kazuo Shimomura, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 275 days.

(21) Appl. No.: 15/800,217

(22) Filed: Nov. 1, 2017

(65) Prior Publication Data
US 2018/0178593 A1    Jun. 28, 2018

(30) Foreign Application Priority Data

Dec. 28, 2016  (JP) .................. 2016-254791

(51) Int. Cl.
| B60C 15/06 | (2006.01) |
|---|---|
| B60C 13/00 | (2006.01) |
| B60C 15/00 | (2006.01) |
| B60C 13/04 | (2006.01) |

(52) U.S. Cl.
CPC .......... B60C 15/0603 (2013.01); B60C 13/00 (2013.01); B60C 15/0045 (2013.01); B60C 15/0009 (2013.01); B60C 15/0054 (2013.01); B60C 2013/045 (2013.01); B60C 2015/009 (2013.01); B60C 2015/061 (2013.01); B60C 2015/0614 (2013.01); B60C 2015/0617 (2013.01); B60C 2015/0621 (2013.01); B60C 2015/0625 (2013.01)

(58) Field of Classification Search
CPC ......... B60C 2015/0617–0625; B60C 15/0603; B60C 2001/005; B60C 15/06; B60C 2015/0614; B60C 2013/045; B60C 2013/005; B60C 2013/006; B60C 2013/007; Y10T 152/10828; Y10T 152/10837

See application file for complete search history.

(56) References Cited

U.S. PATENT DOCUMENTS 5,060,707 A * 10/1991 Sumikawa .............. B60C 13/00
152/517

FOREIGN PATENT DOCUMENTS

| JP | 2003-312213 A | 11/2003 |
|---|---|---|
| JP | 2003312213 A * | 11/2003 |
| JP | 2013-241043 A | 12/2013 |
| JP | 2014-54925 A | 3/2014 |
| JP | 2014054925 A * | 3/2014 |

* cited by examiner

Primary Examiner — Robert C Dye
Assistant Examiner — Farah Taufiq
(74) Attorney, Agent, or Firm — Westerman, Hattori, Daniels & Adrian, LLP

(57) ABSTRACT

A pneumatic tire has a carcass layer, a side wall rubber which forms an outer surface of a side wall portion, and a rim strip rubber which forms an outer surface of a bead portion. The rim strip rubber extends in a tire radial direction between the carcass layer and the side wall rubber. A height of the rim strip rubber on the basis of an outer diameter position of a bead core buries in the bead portion is equal to or more than 70% of a height of a tire outer diameter position. A thickness Tw of the rim strip rubber at the tire maximum width position is smaller than the maximum thickness Tm of the rim strip rubber which is closer to an outer side in the tire radial direction than the tire maximum width position.

11 Claims, 3 Drawing Sheets

PNEUMATIC TIRE

BACKGROUND OF THE INVENTION

Field of the Invention

The present invention relates to a pneumatic tire which can achieve excellent steering stability performance and ride comfort performance while maintaining a rolling resistance.

Description of the Related Art

In general, the pneumatic tire tends to generate a local deflection in an outer region in a tire radial direction of a side wall portion, so called a buttress region. As a result, the steering stability performance tends to be lowered due to generation of yawing, and the ride comfort performance tends to be deteriorated by deflection being prevented in a whole of the tire. Conventionally, the rigidity of the buttress region has been enhanced by increasing a thickness of the tire, thereby suppressing the local deflection, however, since an energy loss is increased by increasing the thickness of the buttress region, there has been a problem that the rolling resistance is deteriorated.

Patent document 1 describes a pneumatic tire in which a height of a rim strip rubber is set to be between 36 and 44% of a height from an inner edge of the tire to an equator. However, since the rim strip rubber having this degree of height is not arranged in the buttress region, an effect of suppressing the local deflection by enhancing the rigidity of the buttress region can not be obtained.

Patent document 2 describes a pneumatic tire in which the height of the rim strip rubber is changed in a wavy manner within a range between 0.5 and 0.7 times of a tire cross sectional height, and an average height is set to be equal to or less than 0.6 times of the tire cross sectional height. However, since the height of the rim strip rubber is periodically lowered, it is thought that the rigidity of the buttress region can not be sufficiently enhanced. In the first place, in Patent document 2, the effect of improving the rolling resistance is thought to be deteriorated if the average height goes beyond 0.6 times of the tire cross sectional height.

Patent document 3 describes a pneumatic tire in which an upper end of the rim strip rubber is arranged between 60 and 75% of the tire cross sectional height on the basis of a tire outer diameter position (between 25 and 40% on the basis of a bead base line), and a lower end of an inner rubber layer of a side wall rubber having a multilayer rubber structure is arranged between 30 and 50% of the tire cross sectional height on the basis of the tire outer diameter position (between 50 and 70% on the basis of the bead base line). However, there is fear that the rolling resistance is deteriorated by the distortion being locally concentrated into the upper end of the rim strip rubber and the lower end of the inner rubber layer.

PRIOR ART DOCUMENT

Patent Document

Patent Document 1: JP-A-2014-54925
Patent Document 2: JP-A-2013-241043
Patent Document 3: JP-A-2003-312213

SUMMARY OF THE INVENTION

The present invention is made by taking the actual condition mentioned above into consideration, and an object of the present invention is to provide a pneumatic tire which can achieve excellent steering stability performance and ride comfort performance while maintaining a rolling resistance.

The present invention provides a pneumatic tire comprising a carcass layer which gets to a bead portion from a tread portion via a side wall portion, a side wall rubber which forms an outer surface of the side wall portion, and a rim strip rubber which forms an outer surface of the bead portion, wherein the rim strip rubber extends in a tire radial direction between the carcass layer and the side wall rubber, and a height of the rim strip rubber on the basis of an outer diameter position of a bead core buries in the bead portion is equal to or more than 70% of a height of a tire outer diameter position, and wherein a thickness Tw of the rim strip rubber at the tire maximum width position is formed smaller than the maximum thickness Tm of the rim strip rubber which is closer to an outer side in the tire radial direction than the tire maximum width position.

In the tire, since the height of the rim strip rubber on the basis of the outer diameter position of the bead core is equal to or more than 70% of the height of the tire outer diameter position, the rigidity of the buttress region is enhanced, and the steering stability performance is improved. Further, since the thickness of the rim strip rubber is formed relatively smaller at the tire maximum width position in comparison with the buttress region, the side wall portion tends to deflect while enlarging the height of the rim strip rubber. As a result, the local deflection in the buttress region can be suppressed, and the tire is going to deflect in a whole region, whereby the excellent ride comfort performance can be achieved.

Making the thickness of the rim strip rubber at the tire maximum width position relatively small is not only advantageous in relation to the ride comfort performance as mentioned above, but also advantageous in the steering stability performance and the rolling resistance. More specifically, since the peripheral portion of the tire maximum width position tends to deflect, the distortion having an inclination to be concentrated in the buttress region is dispersed. As a result, it is possible to improve the steering stability performance. Further, since it is possible to reduce the distortion in the buttress region which causes the energy loss, it is possible to maintain the rolling resistance while enlarging the height of the rim strip rubber.

In the light of enhancement of the rigidity of the buttress region by the rim strip rubber, it is preferable that a height of the rim strip rubber on the basis of a bead base line is equal to or more than 75% of a tire cross sectional height.

In the light of appropriately forming the rim strip rubber which extends in the tire radial direction between the carcass layer and the side wall rubber and reaches the buttress region, it is preferable that the thickness Tw of the rim strip rubber is equal to or more than 0.5 mm.

In the light of making the thickness of the rim strip rubber at the tire maximum width position relatively small, it is preferable that a difference between the thickness Tw of the rim strip rubber and the maximum thickness Tm is equal to or more than 0.5 mm.

It is preferable that the thickness of the rim strip rubber is reduced little by little from an exposed position of an interface between the side wall rubber and the rim strip rubber toward the outer side in the tire radial direction, and the thickness of the rim strip rubber is increased little by little from the tire maximum width position toward the outer side in the tire radial direction. According to the structure mentioned above, the rigidity change by the rim strip rubber is mild, which is advantageous for improving the ride comfort performance.

It is preferable that a side reinforcing layer extending in the tire radial direction from the bead portion to the side wall portion is buried, and an upper end of the side reinforcing layer is arranged in a region which is 30 mm in the tire radial direction centering around the tire maximum width position. According to the structure mentioned above, since it is possible to effectively disperse the distortion having an inclination to be concentrated in the buttress region by concentrating the distortion at the traveling time to the peripheral portion of the tire maximum width position, the more excellent steering stability performance can be achieved while well maintaining the rolling resistance.

In the above structure, it is preferable that the upper end of the side reinforcing layer is 10 mm or more away from the tire maximum width position in the tire radial direction. Since the upper end of the side reinforcing layer is appropriately away from the tire maximum width position, it is possible to prevent the distortion at the traveling time from being locally concentrated, and it is possible to secure the effect of improving the steering stability performance and the ride comfort performance.

It is preferable that a wound-up end of the carcass layer wound up in the bead portion reaches a belt layer which is buried in the tread portion. According to the structure mentioned above, the rigidity of the buttress region can be enhanced not only by the rim strip rubber but also by the carcass layer. Further, since the wound-up end is not arranged in the vicinity of the upper end of the side reinforcing layer and the bead filler, it is possible to prevent the distortion from being locally concentrated at a position where the member ends are concentrated.

DETAILED DESCRIPTION OF THE PREFERRED EMBODIMENTS

An embodiment of the present invention will be explained with reference to the drawings.

Figure 1:
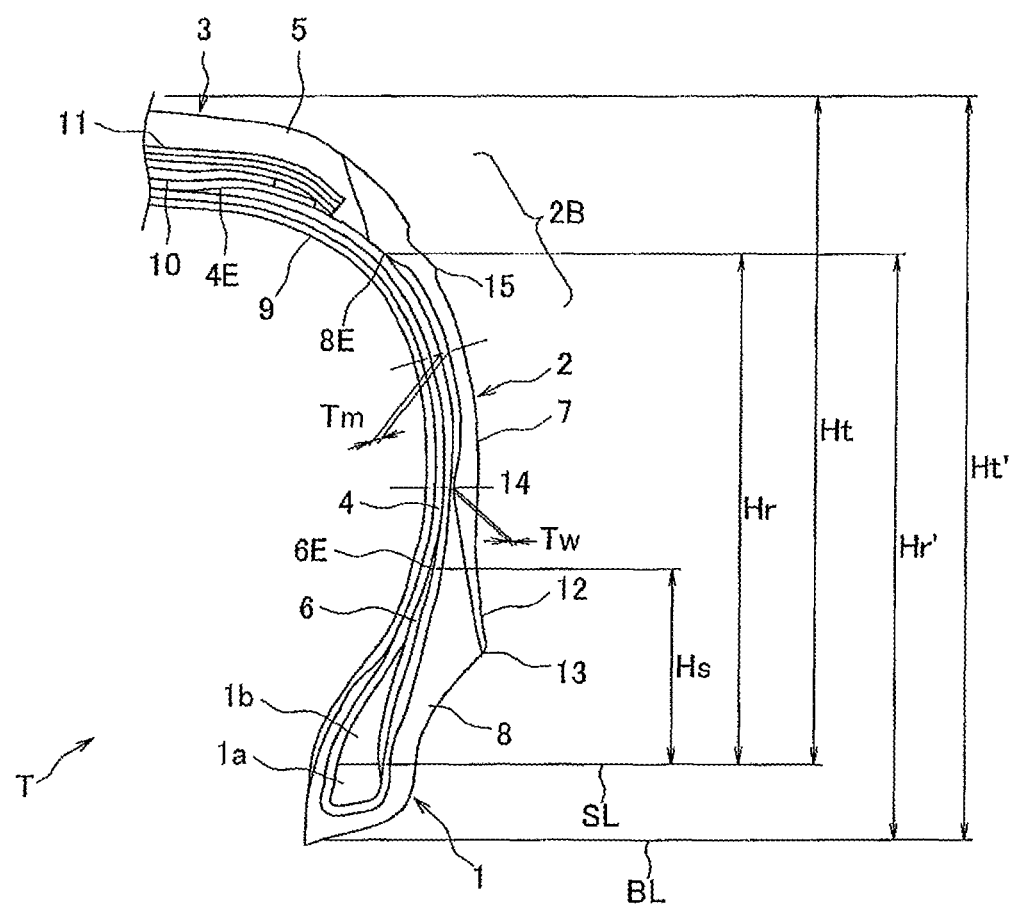
FIG. 1 is a tire meridian partial cross sectional view showing an example of a pneumatic tire according to the present invention.

A pneumatic tire T shown in FIG. 1 includes a pair of bead portions 1, sidewall portions 2 extending from the bead portions 1 toward an outer side in the tire radial direction, respectively, and a tread portion 3 connected to the outer ends in the tire radial direction of the sidewall portions 2. An annular bead core 1a and a bead filler 1b are buries in the bead portion 1, the bead filler 1b being provided in an outer side in a tire radial direction of the bead core 1a. The bead core 1a is formed by coating a converged body such as a steel wire with a rubber. The bead filler 1b is formed by a hard rubber which extends to an outer side in the tire radial direction and is formed into a triangular cross section. The buttress region 2B is a region in an outer side in the tire radial direction of the side wall portion 2 and is also a region which is not grounded at the normal traveling time on a flat paved road.

The pneumatic tire T is further provided with a carcass layer 4 which gets to the bead portion 1 from the tread portion 3 via the side wall portion 2, a tread rubber 5 which forms an outer surface of the tread portion 3, a side wall rubber 7 which forms an outer surface of the side wall portion 2, and a rim strip rubber 8 which forms an outer surface of the bead portion 1. An inner side of the carcass layer 4 is provided with an inner liner rubber 9 for retaining pneumatic pressure. An inner side of the tread rubber 5 in the tire radial direction is provided with a belt layer 10 which is laminated on the carcass layer 4, and a belt reinforcing layer 11 which is laminated on to the belt layer 10.

The carcass layer 4 is formed by a carcass ply obtained by coating with the rubber a plurality of cords arranged in a direction which is approximately orthogonal to the tire circumferential direction. Metals such as steel and organic fibers such as polyester, rayon, nylon and aramid are preferably employed for the material of the cord. The carcass layer 4 is constructed by one sheet of carcass ply, however, plural sheets of laminated carcass plies may be used in place of this. In the present embodiment, since a super high turn-up structure is employed as mentioned below, the effect of improving the rigidity achieved by the carcass layer 4 can be appropriately obtained even if the number of the carcass ply is one.

The carcass layer 4 is wound up (turned up) in the bead portion 1 so as to pinch the bead core 1a and the bead filler 1b. In other words, the carcass layer 4 is provided with the wound-up ply which is arranged in the outer sides of the bead core 1a and the bead filler 1b in the tire width direction in series, to the main body ply which gets to the bead portion 1 from the tread portion 3 via the side wall portion 2. The wound-up end 4E is an end portion of (the wound-up ply of) the wound-up carcass layer 4.

The belt layer 10 is formed by the belt ply obtained by coating a plurality of cords arranged in a direction which is inclined to the tire circumferential direction, with the rubber. The belt layer 10 is constructed by plural sheets (two sheets in the present embodiment) of belt plies, and is laminated in such a manner that the cords intersect in inverted directions to each other between the plies. The steel is preferably employed for the material of the cord. The belt reinforcing layer 11 is formed by a reinforcing ply obtained by coating the cords extending substantially in the tire circumferential direction with the rubber. The organic fibers as mentioned above are preferably employed for the material of the cord. It is possible to suppress the floating-up of the belt ply at the high-speed traveling time so as to improve a high-speed durability by covering the end portion of the belt layer 10 with the belt reinforcing layer 11.

A rim protector 12 formed by making an outer surface of the bead portion 1 bulge to an outer side in the tire width direction is formed in the bead portion 1 of the tire T according to the present embodiment. The rim protector 12 has a function of preventing deformation and damage of a rim flange caused by contact with stone curbs in a shoulder. The rim strip rubber 8 is continuously provided in an inner side of the side wall rubber 7 in the tire radial direction, and an exposes position 13 of an interface thereof is set in an inner peripheral surface of the rim protector 12. The pneumatic tire according to the present invention is not limited to the structure in which the rim protector mentioned above is formed.

The tire maximum width position 14 is a position where a profile line of the outer surface of the tire T in the side wall portion 2 gets most away from the tire equator in the tire width direction. The profile line is a profile of an outer surface of the side wall portion main body except the projection such as the rim protector 12, and generally has a tire meridian cross sectional shape which is defined by smoothly connecting a plurality of circular arcs.

The rim strip rubber 8 is provided at a position which is in contact with a rim (not shown) to which the tire T is installed. The rim strip rubber 8 is formed by the rubber which is excellent in a wear resistance, and a modulus of the rim strip rubber 8 is higher than a modulus of the side wall rubber 7. Since the rim strip rubber 8 according to the present embodiment extends long in the tire radial direction and is arranged in the side wall portion 2, the modulus of the rim strip rubber 8 is preferably lower than the modulus of the bead filler 1b in the light of not raising a vertical rigidity of the tire T excessively. The modulus indicates a 100% elongation modulus (M100) which is measured on the basis of JISK6251

The rim strip rubber 8 extends in the tire radial direction between the carcass layer 4 and the side wall rubber 7. A height Hr of the rim strip rubber 8 on the basis of the outer diameter position of the bead core 1a buried in the bead portion 1 is equal to or more than 70% of a height Ht of the tire outer diameter position. A reference line SL is a virtual line which extends in the tire width direction through the outer diameter position of the bead core 1a. The height Hr is a distance in the tire radial direction from the reference line SL to the upper end 8E of the rim strip rubber 8, and the height Ht is a distance in the tire radial direction to the tire outer diameter position therefrom. The upper end indicates an outer end in the tire radial direction in the member.

Figure 2:
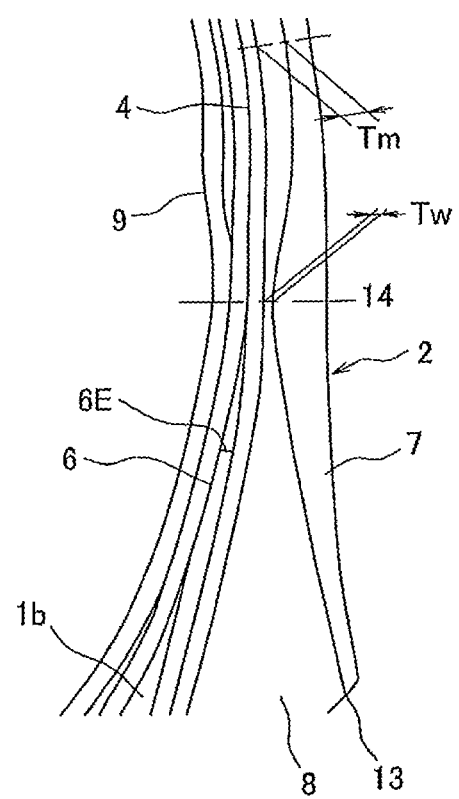
FIG. 2 is a cross sectional view showing a substantial part of the tire in FIG. 1.

Further, in the pneumatic tire T, a thickness Tw of the rim strip rubber 8 at the tire maximum width position 14 is formed to be smaller than the maximum thickness Tm of the rim strip rubber 8 which is closer to the outer side in the tire radial direction than the tire maximum width position 14. The thickness of the rim strip rubber 8 is measured along a direction which is perpendicular to the carcass layer 4. As shown in FIG. 2 in an enlarged manner, the outer surface of the rim strip rubber 8 is formed by a curved surface which is depressed toward an inner side in the tire width direction (a left side in FIG. 2) in the tire maximum width position 14, and the thickness thereof is locally reduced.

In the tire T, the height Hr is equal to or more than 70% of the height Ht as mentioned above, and the rim strip rubber 8 is arranged in the buttress region 2B. As a result, it is possible to improve the steering stability performance by enhancing the rigidity of the buttress region 2B. Further, since the thickness Tw of the rim strip rubber 8 is relatively smaller at the tire maximum width position 14 in comparison with the maximum thickness Tm of the rim strip rubber 8 in the buttress region 2B, the side wall portion 2 tends to deflect while enlarging the height of the rim strip rubber 8. As a result, the local deflection can be suppressed in the buttress region 2B, and the tire deflects in its entirety, so that the excellent ride comfort performance can be achieved.

Further, since the thickness of the rim strip rubber 8 is relatively small at the tire maximum width position 14, the peripheral portion of the tire maximum width position 14 tends to deflect, and the distortion which tends to be concentrated to the buttress region 2B is dispersed. As a result, it is possible to well improve the steering stability performance. Further, since it is possible to reduce the distortion in the buttress region 2B which causes the energy loss, the rolling resistance can be maintained while enlarging the height of the rim strip rubber 8. In order to achieve the effect of dispersing the distortion as mentioned above, it is important to set a difference in the thickness of the rim strip rubber 8 between the buttress region 2B and the tire maximum width position 14.

In the light of enhancement of the rigidity of the buttress region 2B, a height Hr' of the rim strip rubber 8 on the basis of a bead base line BL is preferably equal to or more than 75% of a tire cross sectional height Ht. In the present embodiment, the upper end 8E of the rim strip rubber 8 does not reach the tread rubber 5, however, the structure is not limited to this. The upper end 8E is arranged closer to an outer side in the tire radial direction than the upper ends of the bead filler 1b and the side reinforcing layer 6 mentioned later, and is arranged closer to an inner side in the tire radial direction than the wound-up end 4E of the carcass layer 4. The height of the rim strip rubber 8 is substantially fixed along the tire circumferential direction.

In the present embodiment, a step portion 15 is formed in an outer surface of the buttress region 2B. The step portion 15 is provided at a position corresponding to a fitting portion between a sector and the side plate of a curing mold. In the light of preventing the distortion at the traveling from being locally concentrated to the periphery of the step portion 15, the upper end 8E is preferably positioned closer to the outer side in the tire radial direction than an intersecting point between a normal line extending perpendicular to the carcass layer 4 through an apex of the step portion 15 and the outer surface of the carcass layer 4, and the upper end 8E is preferably 5 mm or more away from the intersecting point.

In the light of appropriately forming the rim strip rubber 8 which extends in the tire radial direction between the carcass layer 4 and the side wall rubber 7 and reaches the buttress region 2B, the thickness Tw is preferably equal to more than 0.5 mm, and more preferably equal to or more than 1.0 mm. In the light of setting the difference in the thickness of the rim strip rubber 8 between the buttress region 2B and the tire maximum width position 14, a difference (Tm-Tw) between the thickness of the rim strip rubber 8 and the maximum thickness Tm is preferably equal to or more than 0.5 mm, and more preferably equal to or more than 1.0 mm.

In the present embodiment, the thickness of the rim strip rubber 8 is reduced little by little from the exposed position 13 of the interface between the side wall rubber 7 and the rim strip rubber 8 toward the outer side in the tire radial direction. The thickness of the rim strip rubber 8 is the greatest in the exposed position 13 of the interface, and is reduced little by little to the tire maximum width position 14 therefrom to come to the thickness Tw. Further, the thickness of the rim strip rubber 8 is increased little by little from the tire maximum width position 14 toward the outer side in the tire radial direction to come to the maximum thickness Tm. The rim strip rubber 8 is reduced its thickness at the upper end 8E thereof and the tire maximum width position 14, however, extends along the carcass layer 4 while maintaining the maximum thickness Tm between them.

In the present embodiment, the side reinforcing layer 6 extending in the tire radial direction from the bead portion 1 to the side wall portion 2 is buried. The side reinforcing layer 6 is formed by a side ply obtained by coating with the rubber a plurality of cords Which are aligned in parallel to each other. The cords constructing the side ply in the present embodiment are the steel cords, and are arranged in a direction which is inclined to the tire circumferential direction. A lower end (an inner end in the tire radial direction) of the side reinforcing layer 6 is arranged in a lateral side of the bead core 1a. The side reinforcing layer 6 is provided in such a manner as to be interposed between the bead filler 1b and the wound-up ply of the carcass layer 4, however, may be provided in such a manner as to be attached to the outer side in the tire width direction of the carcass layer 4.

The upper end 6E of the side reinforcing layer 6 is preferably arranged in a region which is 30 mm in the tire radial direction centering around the tire maximum width position 14. As a result, it is possible to effectively disperse the distortion having an inclination to be concentrated to the buttress region 2B by concentrating the distortion to the peripheral portion of the tire maximum width position 14. Therefore, the more excellent steering stability performance can be achieved while well maintaining the rolling resistance. A height Hs of the side reinforcing layer 6 on the basis of the outer diameter position of the bead core 1a is set, for example, to 15 to 40% of the height Ht.

In the case that the upper end 6E of the side reinforcing layer 6 is arranged in the vicinity of the tire maximum width position 14 as mentioned above, it is preferable to set the upper end 6E 10 mm or more away from the tire maximum width position 14 in the tire radial direction. The distortion at the traveling time can be prevented from being locally concentrated in a pinpointing manner by appropriating setting the upper end 6E away from the tire maximum width position 14. As a result, it is possible to secure the effect of improving the steering stability performance and the ride comfort performance.

In the present embodiment, the wound-up end 4E of the carcass layer 4 wound up in the bead portion 1 reaches the belt layer 10 which is buried in the tread portion 3. This is also called as the super high turn-up structure, and the wound-up end 4E is arranged closer to the inner side in the tire width direction than the end portion of the belt layer 10. As a result, the rigidity of the buttress region 2B is enhanced not only by the rim strip rubber 8 but also by the carcass layer 4. Further, since the wound-up end 4E is not arranged in the vicinity of the upper ends of the side reinforcing layer 6 and the bead filler 1b, it is possible to prevent the distortion from being locally concentrated to a position where the member ends are concentrated.

Each of the dimensions of the tire T mentioned above such as the height Hr of the rim strip rubber 8 is assumed to be measured in a state in which the tire is installed to a standard rim, a regular internal pressure is charged and any load is not applied. The rubber interface as shown can be specified in the tire cross section after the cure molding, and can be discriminated according to a nature of the rubber interface which is thin observed in the cross section, for example, by cutting the tire with a sharp cutting tool.

The standard rim is a rim which is defined every tire in a standard system including the standard on which the tire is based, for example, a standard rim in JATMA, "Design Rim" in TRA or "Measuring Rim" in ETRTO. The regular internal pressure is the pneumatic pressure defined every tire in the standard system including the standard on which the tire is based, and is set to the maximum pneumatic tire in JATMA, the maximum value described in Table "TIRE LOAD LIMITS AT VARIOUS COLD INFLATION PRESSURES" in TRA, and "INFLATION PRESSURE" in ETRTO.

The pneumatic tire according to the present invention can be structured in the same manner as the normal pneumatic tire except the matter that the rim strip rubber is structured as mentioned above, and the conventionally known materials, shapes and manufacturing methods can be all employed in the present invention. The structure of the rim strip rubber as mentioned above may be applied at least to one side of the tire, however, is preferably applied to both sides of the tire for enhancing the improving effect.

The present invention is not limited to the embodiment mentioned above, but can be variously modified and changed within the scope of the present invention.

EXAMPLES

An example which concretely shows the structure and effect of the present invention will be explained. In the following performance evaluations (1) to (3), the tire having the size 295/40R20 106Y was installed to the rim of 20×10.5 J, and the pneumatic pressure was set to 250 kPa.

(1) Rolling Resistance

The rolling resistance was measured according to the test method which is defined in JIS D 4234 (ISO28580). The evaluation was made by an index number in which the result of a comparative example 1 is set to 100, and the smaller the numerical value is, the smaller the rolling resistance is, which indicates the good rolling resistance.

(2) Steering Stability Performance

The tire was installed to the vehicle (SUV of 3000 cc class) and travels on an evaluation road surface, and a subjective test was carried out by a driver on the basis of execution of turning, braking and accelerating tests. The evaluation was made by an index number in which the result of the comparative example 1 is set to 100, and the larger the numerical value is, the more excellent the steering stability performance is.

(3) Ride Comfort Performance

The tire was installed to the vehicle (SUV of 3000 cc class) and travels on a dry evaluation road surface, and a subjective test was carried out by the driver. The evaluation was made by an index number in which the result of the comparative example 1 is set to 100, and the larger the numerical value is, the more excellent the ride comfort performance is.

Comparative Examples 1 to 4

Figure 3:
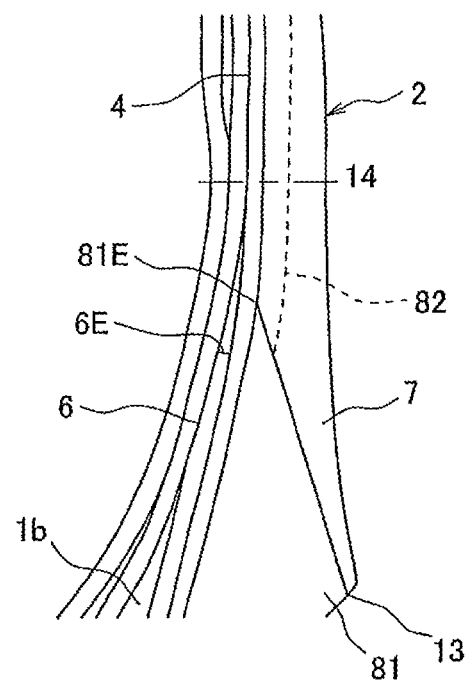
FIG. 3 is a cross sectional view showing a substantial part of a tire according to a comparative example.

Comparative examples 1 to 4 were set to examples in which the aspect of the rim strip rubber was differentiated in the embodiment mentioned above. In the comparative example 1, an upper end 81E of a rim strip rubber does not reach the tire maximum width position 14 such as the rim strip rubber 81 shown in FIG. 3. Therefore, the thicknesses Tw and Tm are both zero. In the comparative examples 2 to 4, a rim strip rubber extends in the tire radial direction with a fixed thickness after the thickness is reduced little by little from the exposed position 13 of the interface toward the outer side in the tire radial direction, such as the rim strip rubber 82 shown by a broken line in FIG. 3. Therefore, the thickness Tw is the same magnitude as the thickness Tm. Further, in the comparative example 4, the upper end of the side reinforcing layer is aligned with the tire maximum width position. The other structures of the tire are common with the working example 1.

Working Example 1

An working example 1 was set to an example in which the height of the rim strip rubber was differentiated in the embodiment mentioned above. In the working example 1, the thickness Tw of the rim strip rubber is formed smaller than the thickness Tm, and the upper end of the side reinforcing layer is arranged so as to be 11 mm away from the tire maximum width position to the inner side in the tire radial direction. The other structures of the tire are common in each of the examples. In Table 1, the thicknesses Tb and Ts are respectively thicknesses of the rim strip rubber at the upper end position of the bead filler and the upper end position of the side reinforcing layer.

TABLE 1

|  | Comparative Example 1 | Comparative Example 2 | Comparative Example 3 | Working Example 1 | Comparative Example 4 |
|---|---|---|---|---|---|
| Height Hr/Ht (%) | 35 | 55 | 70 | 70 | 70 |
| Height Hs/Ht (%) | 32 | 32 | 32 | 32 | 42 |
| Thickness Tb (mm) | 9.0 | 9.0 | 9.0 | 9.0 | 9.0 |
| Thickness Ts (mm) | 0.5 | 2.5 | 2.5 | 3.0 | 1.5 |
| Thickness Tw (mm) | 0 | 2.5 | 2.5 | 1.5 | 2.5 |
| Thickness Tm (mm) | 0 | 2.5 | 2.5 | 2.5 | 2.5 |
| Rolling resistance | 100 | 100 | 100 | 100 | 102 |
| Steering stability performance | 100 | 103 | 105 | 110 | 100 |
| Ride comfort performance | 100 | 95 | 95 | 105 | 95 |

As shown in Table 1, in the working example 1, it is possible to achieve the steering stability performance and the ride comfort performance which are more excellent than the comparative examples 1 to 4, while maintaining the rolling resistance.

What is claimed is:

1. A pneumatic tire comprising:
   a carcass layer which gets to a bead portion from a tread portion via a side wall portion;
   a side wall rubber which forms an outer surface of the side wall portion; and
   a rim strip rubber which forms an outer surface of the bead portion, and comprises a first portion covered by the side wall portion and a second portion uncovered by the side wall portion,
   wherein the rim strip rubber extends in a tire radial direction between the carcass layer and the side wall rubber, and a height of the rim strip rubber on the basis of an outer diameter position of a bead core buries in the bead portion is equal to or more than 70% of a height of a tire outer diameter position, and
   wherein a thickness Tw of the rim strip rubber at the tire maximum width position is formed smaller than the maximum thickness Tm of the rim strip rubber which is closer to an outer side in the tire radial direction than the tire maximum width position.

2. The pneumatic tire according to claim 1, wherein a height of the rim strip rubber on the basis of a bead base line is equal to or more than 75% of a tire cross sectional height.

3. The pneumatic tire according to claim 1, wherein the thickness Tw of the rim strip rubber is equal to or more than 0.5 mm.

4. The pneumatic tire according to claim 1, wherein a difference between the thickness Tw of the rim strip rubber and the maximum thickness Tm is equal to or more than 0.5 mm.

5. The pneumatic tire according to claim 1, wherein the thickness of the rim strip rubber is reduced from an exposed position which defines a boundary between the side wall rubber and the second portion of the rim strip rubber toward the outer side in the tire radial direction, and the thickness of the rim strip rubber is increased from the tire maximum width position toward the outer side in the tire radial direction.

6. The pneumatic tire according to claim 1, wherein a side reinforcing layer extending in the tire radial direction from the bead portion to the side wall portion is buried, and an upper end of the side reinforcing layer is arranged in a region which is 30 mm in the tire radial direction centering around the tire maximum width position.

7. The pneumatic tire according to claim 6, wherein the upper end of the side reinforcing layer is 10 mm or more away from the tire maximum width position in the tire radial direction.

8. The pneumatic tire according to claim 6, wherein a lower end of the side reinforcing layer is arranged in a lateral side of the bead core.

9. The pneumatic tire according to claim 6, wherein a height of the side reinforcing layer on the basis of the outer diameter position of the bead core is 15 to 40% of the height of the tire outer diameter position.

10. The pneumatic tire according to claim 6, wherein the side reinforcing layer is provided in such a manner as to be interposed between a bead filler and a wound-up ply of the carcass layer.

11. The pneumatic tire according to claim 1, wherein a wound-up end of the carcass layer wound up in the bead portion is arranged closer to the inner side in the tire width direction than the end portion of a belt layer which is buried in the tread portion.

* * * * *